United States Patent
Fong et al.

(10) Patent No.: US 11,950,232 B2
(45) Date of Patent: Apr. 2, 2024

(54) MULTIPLEXING SIDELINK CONTROL INFORMATION-ONLY GRANTS AND DATA-ONLY TRAFFIC

(71) Applicant: QUALCOMM Incorporated, San Diego, CA (US)

(72) Inventors: Lik Hang Silas Fong, Bridgewater, NJ (US); Piyush Gupta, Bridgewater, NJ (US); Junyi Li, Fairless Hills, PA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 17/305,940

(22) Filed: Jul. 16, 2021

(65) Prior Publication Data

US 2023/0013868 A1    Jan. 19, 2023

(51) Int. Cl.
*H04W 72/20* (2023.01)
*H04W 72/044* (2023.01)
*H04W 72/23* (2023.01)

(52) U.S. Cl.
CPC ......... *H04W 72/20* (2023.01); *H04W 72/044* (2013.01); *H04W 72/23* (2023.01)

(58) Field of Classification Search
CPC .......... H04W 72/1278; H04W 72/044; H04W 72/14
See application file for complete search history.

(56) References Cited

U.S. PATENT DOCUMENTS

| | | | |
|---|---|---|---|
| 2020/0260472 A1* | 8/2020 | Ganesan | H04L 1/08 |
| 2022/0095280 A1* | 3/2022 | Farag | H04W 72/1215 |
| 2022/0377726 A1* | 11/2022 | Son | H04L 5/0053 |
| 2023/0209412 A1* | 6/2023 | Liu | H04L 5/0055 370/329 |

* cited by examiner

*Primary Examiner* — Kevin M Cunningham
(74) *Attorney, Agent, or Firm* — Harrity & Harrity LLP / Qualcomm

(57) ABSTRACT

Various aspects of the present disclosure generally relate to wireless communication. In some aspects, a first user equipment (UE) may transmit, to a second UE, a grant-only indicator to indicate that a second stage sidelink control information (SCI-2) is decoupled from physical sidelink shared channel (PSSCH) data in a slot, and that the SCI-2 indicates an SCI-2-only grant. The first UE may transmit, to the second UE in the slot, the SCI-2-only grant multiplexed with data-only traffic in a first PSSCH transmission based at least in part on the grant-only indicator, wherein the SCI-2-only grant indicates a resource allocation for a subsequent slot. Numerous other aspects are described.

31 Claims, 15 Drawing Sheets

1100

MULTIPLEXING SIDELINK CONTROL INFORMATION-ONLY GRANTS AND DATA-ONLY TRAFFIC

FIELD OF THE DISCLOSURE

Aspects of the present disclosure generally relate to wireless communication and to techniques and apparatuses for multiplexing sidelink control information (SCI)-only grants and data-only traffic.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a first user equipment (UE) includes a memory and one or more processors, coupled to the memory, configured to: transmit, to a second UE, a grant-only indicator to indicate that a second stage sidelink control information (SCI-2) is decoupled from physical sidelink shared channel (PSSCH) data in a slot, and that the SCI-2 indicates an SCI-2-only grant; and transmit, to the second UE in the slot, the SCI-2-only grant multiplexed with data-only traffic in a first PSSCH transmission based at least in part on the grant-only indicator, wherein the SCI-2-only grant indicates a resource allocation for a subsequent slot.

In some implementations, an apparatus for wireless communication at a second UE includes a memory and one or more processors, coupled to the memory, configured to: receive, from a first UE, a grant-only indicator to indicate that an SCI-2 is decoupled from PSSCH data in a slot, and that the SCI-2 indicates an SCI-2-only grant; and receive, from the first UE in the slot, the SCI-2-only grant multiplexed with data-only traffic in a first PSSCH transmission based at least in part on the grant-only indicator, wherein the SCI-2-only grant indicates a resource allocation for a subsequent slot.

In some implementations, a method of wireless communication performed by a first UE includes transmitting, to a second UE, a grant-only indicator to indicate that an SCI-2 is decoupled from PSSCH data in a slot, and that the SCI-2 indicates an SCI-2-only grant; and transmitting, to the second UE in the slot, the SCI-2-only grant multiplexed with data-only traffic in a first PSSCH transmission based at least in part on the grant-only indicator, wherein the SCI-2-only grant indicates a resource allocation for a subsequent slot.

In some implementations, a method of wireless communication performed by a second UE includes receiving, from a first UE, a grant-only indicator to indicate that an SCI-2 is decoupled from PSSCH data in a slot, and that the SCI-2 indicates an SCI-2-only grant; and receiving, from the first UE in the slot, the SCI-2-only grant multiplexed with data-only traffic in a first PSSCH transmission based at least in part on the grant-only indicator, wherein the SCI-2-only grant indicates a resource allocation for a subsequent slot.

In some implementations, a non-transitory computer-readable medium storing a set of instructions for wireless communication includes one or more instructions that, when executed by one or more processors of a first UE, cause the first UE to: transmit, to a second UE, a grant-only indicator to indicate that an SCI-2 is decoupled from PSSCH data in a slot, and that the SCI-2 indicates an SCI-2-only grant; and transmit, to the second UE in the slot, the SCI-2-only grant multiplexed with data-only traffic in a first PSSCH transmission based at least in part on the grant-only indicator, wherein the SCI-2-only grant indicates a resource allocation for a subsequent slot.

In some implementations, a non-transitory computer-readable medium storing a set of instructions for wireless communication includes one or more instructions that, when executed by one or more processors of a second UE, cause the second UE to: receive, from a first UE, a grant-only indicator to indicate that an SCI-2 is decoupled from PSSCH data in a slot, and that the SCI-2 indicates an SCI-2-only grant; and receive, from the first UE in the slot, the SCI-2-only grant multiplexed with data-only traffic in a first PSSCH transmission based at least in part on the grant-only indicator, wherein the SCI-2-only grant indicates a resource allocation for a subsequent slot.

In some implementations, a first apparatus for wireless communication includes means for transmitting, to a second apparatus, a grant-only indicator to indicate that an SCI-2 is decoupled from PSSCH data in a slot, and that the SCI-2 indicates an SCI-2-only grant; and means for transmitting, to the second apparatus in the slot, the SCI-2-only grant multiplexed with data-only traffic in a first PSSCH transmission based at least in part on the grant-only indicator, wherein the SCI-2-only grant indicates a resource allocation for a subsequent slot.

In some implementations, a second apparatus for wireless communication includes means for receiving, from a first apparatus, a grant-only indicator to indicate that an SCI-2 is decoupled from PSSCH data in a slot, and that the SCI-2 indicates an SCI-2-only grant; and means for receiving, from the first apparatus in the slot, the SCI-2-only grant multiplexed with data-only traffic in a first PSSCH transmission based at least in part on the grant-only indicator, wherein the SCI-2-only grant indicates a resource allocation for a subsequent slot.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
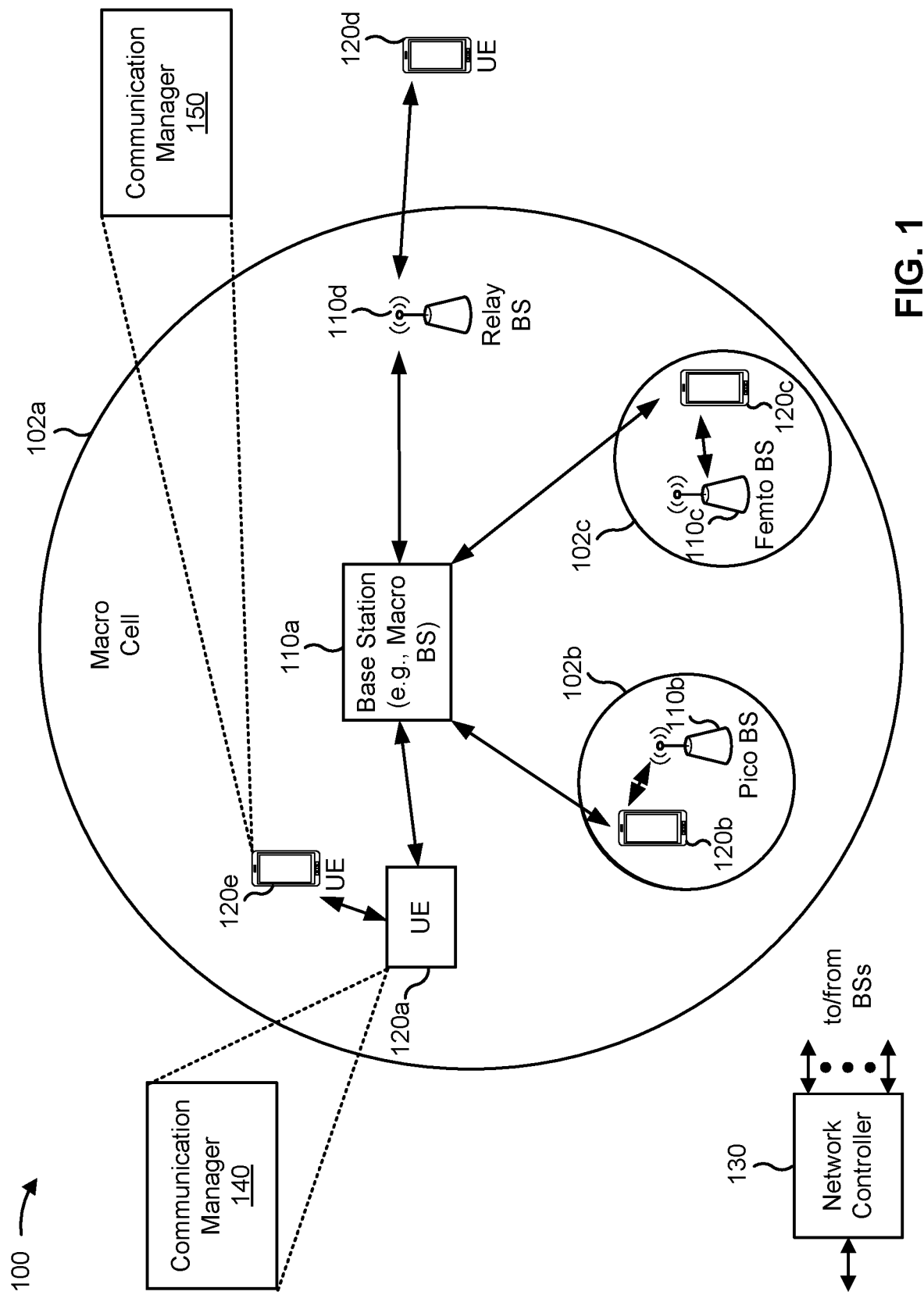
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first UE (e.g., UE 120a) may include a communication manager 140. As described in more detail elsewhere herein, the communication manager 140 may transmit, to a second UE (e.g., UE 120e), a grant-only indicator to indicate that an SCI-2 is decoupled from PSSCH data in a slot, and that the SCI-2 indicates an SCI-2-only grant; and transmit, to the second UE in the slot, the SCI-2-only grant multiplexed with data-only traffic in a first PSSCH transmission based at least in part on the grant-only indicator, wherein the SCI-2-only grant indicates a resource allocation for a subsequent slot. Additionally, or alternatively, the communication manager 140 may perform one or more other operations described herein.

In some aspects, a second UE (e.g., UE 120e) may include a communication manager 150. As described in more detail elsewhere herein, the communication manager 150 may receive, from a first UE, a grant-only indicator to indicate that an SCI-2 is decoupled from PSSCH data in a slot, and that the SCI-2 indicates an SCI-2-only grant; and receive, from the first UE in the slot, the SCI-2-only grant multiplexed with data-only traffic in a first PSSCH transmission based at least in part on the grant-only indicator, wherein the SCI-2-only grant indicates a resource allocation for a subsequent slot. Additionally, or alternatively, the communication manager 150 may perform one or more other operations described herein.

As indicated above, FIG. 1 is provided as an example. Other examples may differ from what is described with regard to FIG. 1.

Figure 2:
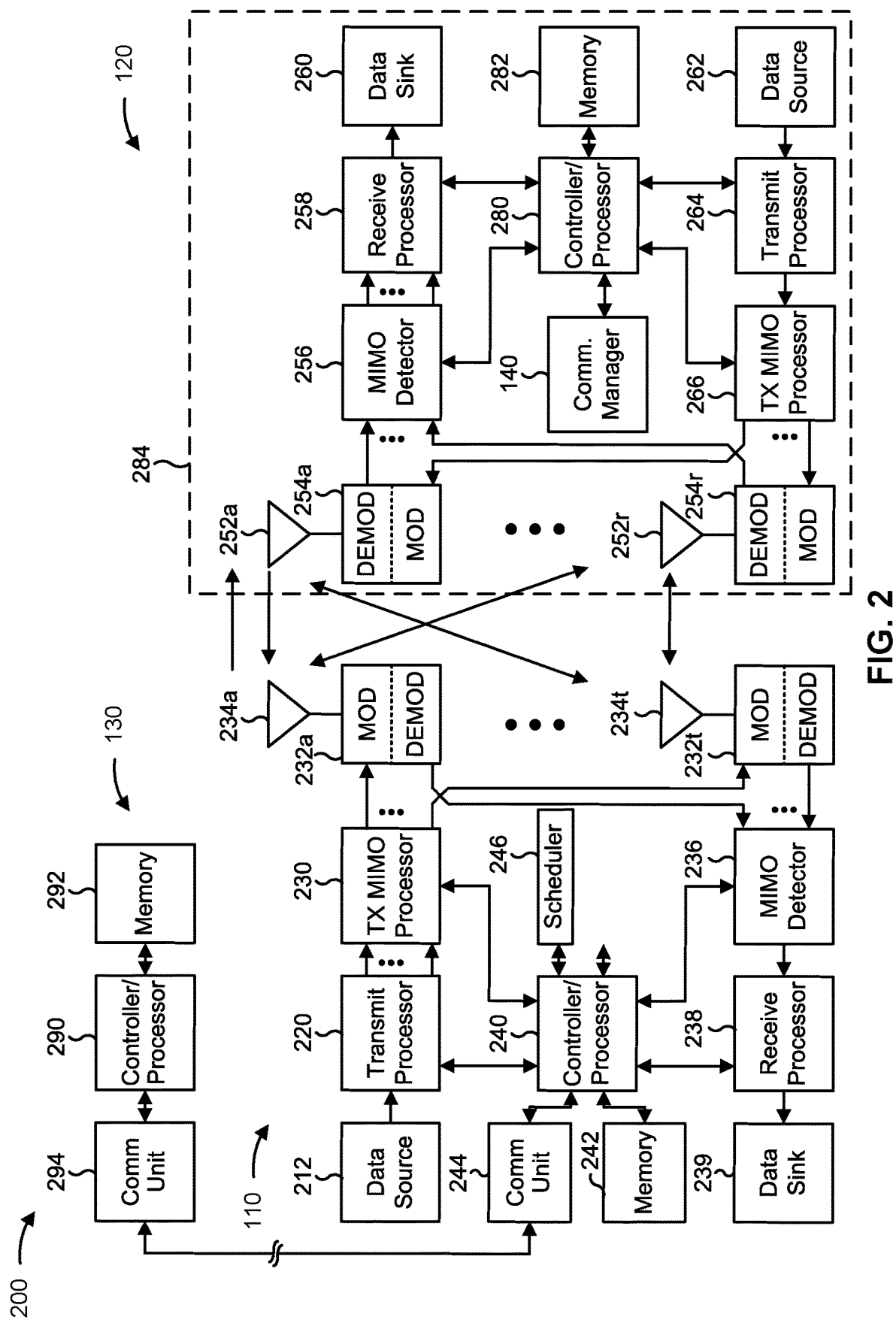
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 10-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 10-13).

The controller/processor 240 of the base station 110, the controller/processor 280 of the UE 120, and/or any other component(s) of FIG. 2 may perform one or more techniques associated with multiplexing SCI-only grants and data-only traffic, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, a first UE (e.g., UE 120a) includes means for transmitting, to a second UE, a grant-only indicator to indicate that an SCI-2 is decoupled from PSSCH data in a slot, and that the SCI-2 indicates an SCI-2-only grant; and/or means for transmitting, to the second UE in the slot, the SCI-2-only grant multiplexed with data-only traffic in a first PSSCH transmission based at least in part on the grant-only indicator, wherein the SCI-2-only grant indicates a resource allocation for a subsequent slot. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second UE (e.g., UE 120*e*) includes means for receiving, from a first UE, a grant-only indicator to indicate that an SCI-2 is decoupled from PSSCH data in a slot, and that the SCI-2 indicates an SCI-2-only grant; and/or means for receiving, from the first UE in the slot, the SCI-2-only grant multiplexed with data-only traffic in a first PSSCH transmission based at least in part on the grant-only indicator, wherein the SCI-2-only grant indicates a resource allocation for a subsequent slot. The means for the second UE to perform operations described herein may include, for example, one or more of communication manager 150 (as shown in FIG. 1), antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
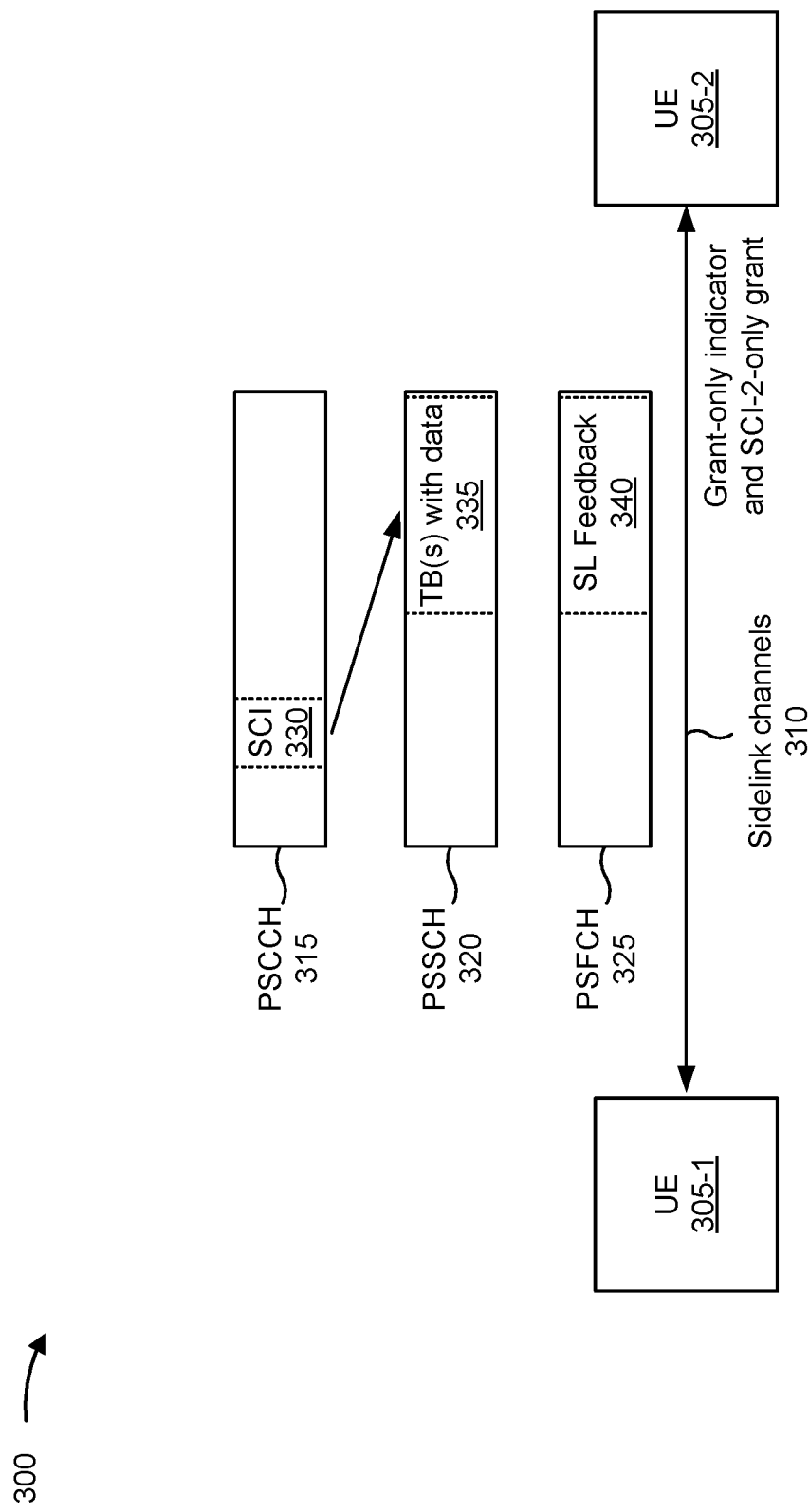
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

In some aspects, the first UE 305-1 may transmit, to the second UE 305-2, a grant-only indicator to indicate that an SCI-2 is decoupled from PSSCH data and that the SCI-2 indicates an SCI-2-only grant. The first UE 305-1 may transmit, to the second UE 305-2 in a slot, the SCI-2-only grant multiplexed with data-only traffic in a first PSSCH transmission based at least in part on the grant-only indicator, where the SCI-2-only grant may indicate a resource allocation for a subsequent slot.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
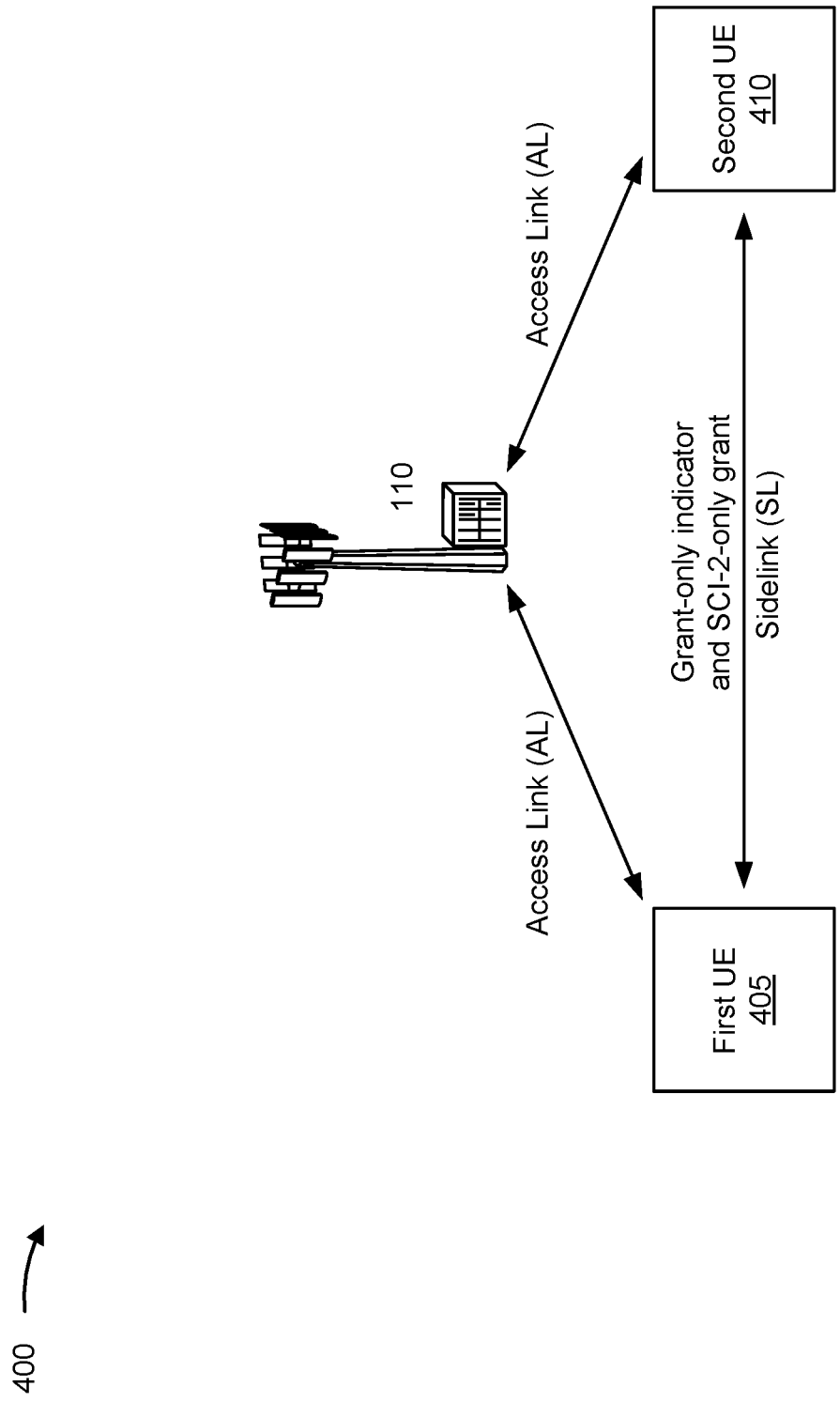
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a first UE 405 and a second UE 410 may communicate with one another via a sidelink, as described above in connection with FIG. 3. As further shown, in some sidelink modes, a base station 110 may communicate with the first 405 via a first access link. Additionally, or alternatively, in some sidelink modes, the base station 110 may communicate with the second 410 via a second access link. The first UE 405 and/or the second UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, the first UE 405 may transmit, to the second UE 410, a grant-only indicator to indicate that an SCI-2 is decoupled from PSSCH data and that the SCI-2 indicates an SCI-2-only grant. The first UE 405 may transmit, to the second UE 410 in a slot, the SCI-2-only grant multiplexed with data-only traffic in a first PSSCH transmission based at least in part on the grant-only indicator, where the SCI-2-only grant may indicate a resource allocation for a subsequent slot.

As indicated above, FIG. 4 is provided as an example. Other examples may differ from what is described with respect to FIG. 4.

In a factory automation environment, mission critical traffic may be deterministic and periodic. The mission critical traffic may involve cyclic data exchanges between a PLC and a quantity of sensors/actuators. The cyclic data exchanges may involve relatively smaller application layer payloads (e.g., 40 to 256 bytes). The mission critical traffic may be subjected to relatively stringent latency and reliability requirements, and both data channels and control channels may be designed to meet the reliability requirements. A relatively large quantity of sensors/actuators (e.g., 20 to 50 sensors/actuators) may be associated with each PLC, and a relatively large quantity of PLCs (e.g., 100 to 1000 PLCs) may be included in a facility.

Figure 5:
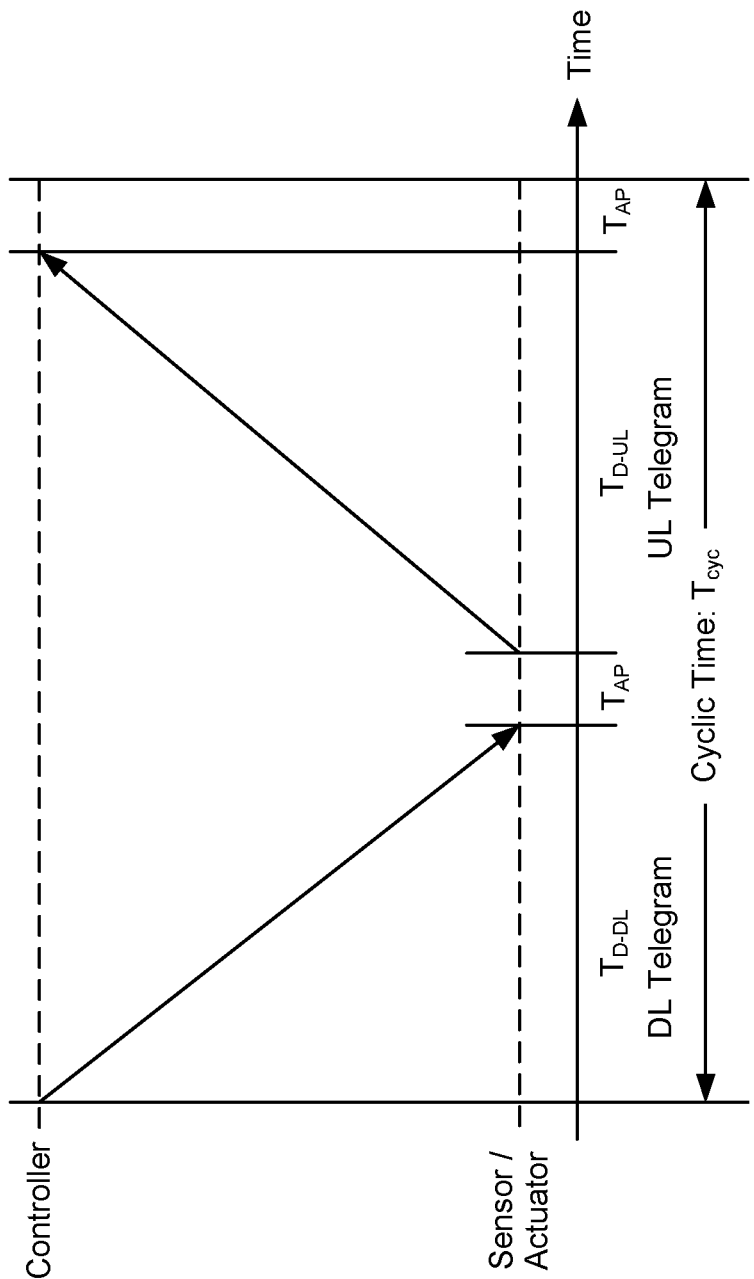
FIG. 5 is a diagram illustrating an example of controller and sensor/actuator communications, in accordance with the present disclosure.

FIG. 5 is a diagram illustrating an example 500 of controller and sensor/actuator communications, in accordance with the present disclosure.

As shown in FIG. 5, a PLC may transmit a downlink message to a sensor/actuator. A period of time associated with transmitting the downlink message may be indicated by $T_{D\text{-}DL}$. After a first processing time ($T_{AP}$), the sensor/actuator may transmit an uplink message to the PLC. A period of time associated with transmitting the uplink message may be indicated by $T_{D\text{-}UL}$. A total cycle time ($T_{cyc}$) may include $T_{D\text{-}DL}$, $T_{D\text{-}UL}$, $T_{AP}$, and a second processing time ($T_{AP}$).

As indicated above, FIG. 5 is provided as an example. Other examples may differ from what is described with respect to FIG. 5.

Figure 6:
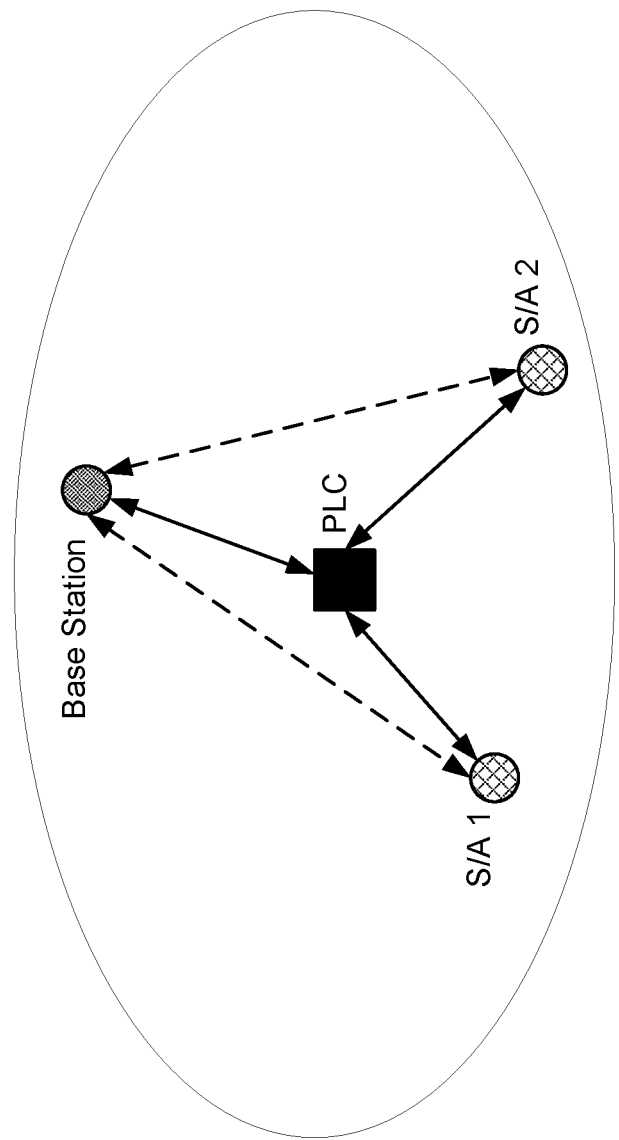
FIG. 6 is a diagram illustrating an example of programmable logic controller (PLC) connectivity, in accordance with the present disclosure.

FIG. 6 is a diagram illustrating an example 600 of PLC connectivity, in accordance with the present disclosure.

A PLC may communicate with a base station and multiple sensors/actuators, such as a first sensor/actuator and a second sensor/actuator. The PLC may wirelessly communicate with the base station via a Uu interface. Wireless PLC connectivity may reduce a reconfiguration cost in a factory. The base station may be ceiling-mounted in the factory. The PLC may wirelessly communicate with the multiple sensors/actuators via multiple sidelink interfaces, such as PC5 interfaces, respectively. For example, the PLC may wirelessly communicate with the first sensor/actuator via a first PC5 interface, and the PLC may wirelessly communicate with the second sensor/actuator via a second PC5 interface. The PLC may be located relatively close to machinery in the factory.

As indicated above, FIG. 6 is provided as an example. Other examples may differ from what is described with respect to FIG. 6.

Figure 7:
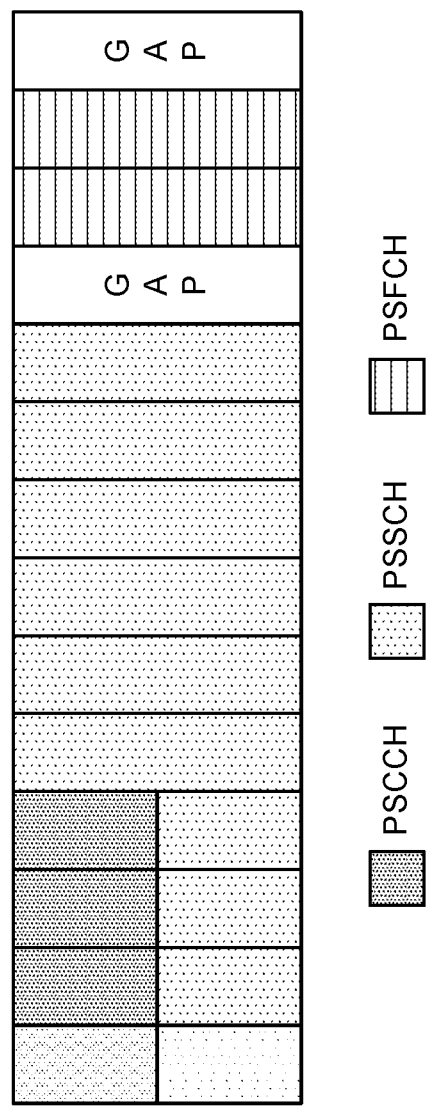
FIG. 7 is a diagram illustrating an example of a slot structure, in accordance with the present disclosure.

FIG. 7 is a diagram illustrating an example 700 of a slot structure, in accordance with the present disclosure.

A slot may be configured with feedback resources. The slot may include 14 OFDM symbols. The slot may include a PSCCH, a PSSCH, and a PSFCH. Resources for the PSFCH may be configured with a period of {0, 1, 2, 4} slots. The PSFCH may include two OFDM symbols, which may include a first OFDM symbol dedicated to the PSFCH and a second OFDM symbol for automatic gain control (AGC) purposes. A gap symbol may be present after the PSFCH.

As indicated above, FIG. 7 is provided as an example. Other examples may differ from what is described with respect to FIG. 7.

Figure 8:
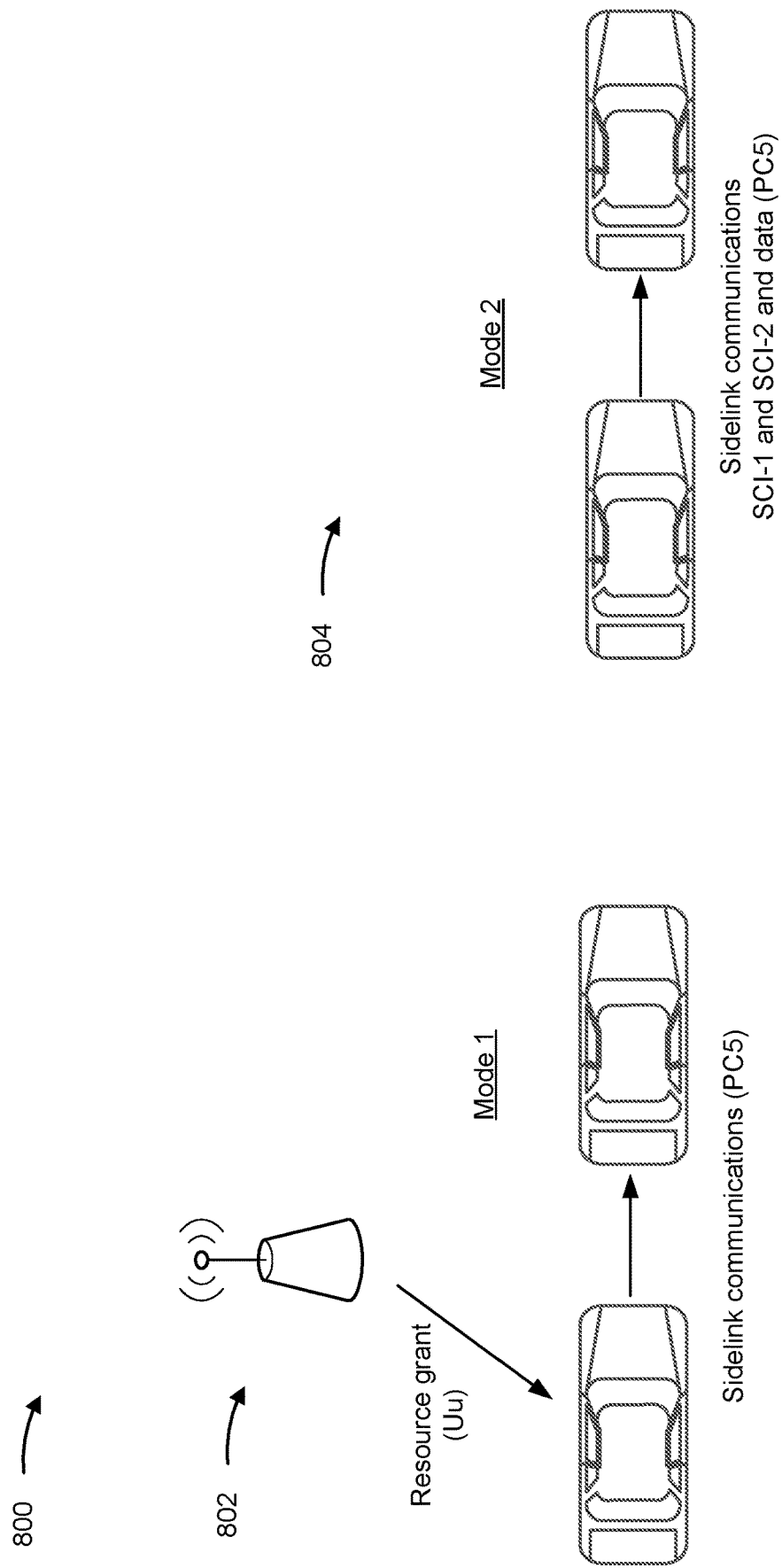
FIG. 8 is a diagram illustrating an example of sidelink operating modes, in accordance with the present disclosure.

FIG. 8 is a diagram illustrating an example 800 of sidelink operating modes, in accordance with the present disclosure.

As shown by reference number 802, in V2X Mode 1, a first resource allocation mode in NR sidelink may involve a base station allocating resources for sidelink communications between UEs. The base station may schedule sidelink resources to be used by a UE for sidelink transmissions via radio resource control (RRC) signaling or via downlink control information (DCI) (e.g., DCI 3_0). The base station may transmit a resource grant via a Uu interface to a first UE. The first UE may communicate with a second UE via a sidelink interface (e.g., a PC5 interface) based at least in part on the resource grant received from the base station.

As shown by reference number 804, in V2X Mode 2, a second resource allocation mode in NR sidelink may involve UEs autonomously selecting sidelink resources. For example, the first UE may select a sidelink resource, and the transmitting UE may communicate with the second UE based at least in part on the sidelink resource.

In the V2X Mode 2, the first UE may determine sidelink resources within sidelink resources configured by the base station or preconfigured sidelink resources. In this case, the base station does not schedule the sidelink resources. The first UE may sense and select the sidelink resources based at least in part on an SCI-1 and/or RSRP measurements of DMRSs associated with a PSSCH and/or a PSCCH. The first UE may use an SCI-1 associated with the PSCCH and an SCI-2 associated with a PSSCH to schedule and transmit data associated with the PSSCH. The PSSCH may be associated with unicast transmissions, groupcast transmissions, or broadcast transmissions. The second UE may transmit an ACK/NACK via a PSFCH after receiving a sidelink transmission from the first UE. For example, the second UE may transmit an explicit ACK/NACK for unicast and groupcast transmissions. As another example, the second UE may transmit an implicit NACK only for groupcast transmissions.

As indicated above, FIG. 8 is provided as an example. Other examples may differ from what is described with respect to FIG. 8.

Figure 9:
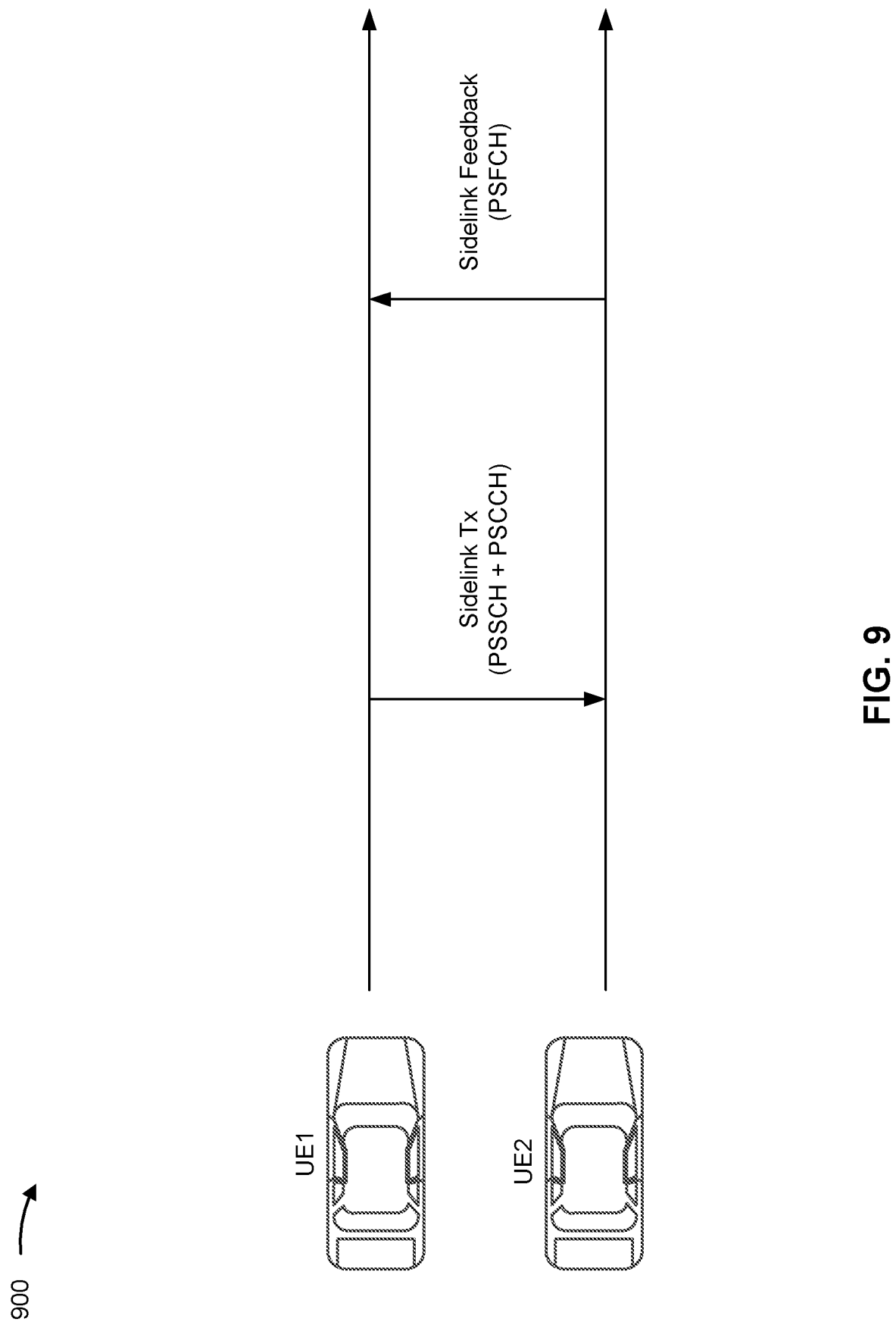
FIG. 9 is a diagram illustrating an example of sidelink communications, in accordance with the present disclosure.

FIG. 9 is a diagram illustrating an example 900 of sidelink communications, in accordance with the present disclosure.

A first UE may send a sidelink transmission to a second UE. The first UE may send the sidelink transmission via a PSCCH and/or a PSSCH. The second UE may transmit sidelink feedback to the first UE based at least in part on the sidelink transmission. The second UE may transmit the sidelink feedback via a PSFCH.

As indicated above, FIG. 9 is provided as an example. Other examples may differ from what is described with respect to FIG. 9.

SCI-scheduled semi persistent scheduling (SPS) transmissions on sidelink channels with data alone may reduce a processing overhead. The SCI-scheduled SPS transmissions may be associated with a forward-link grant or a reverse-link grant. SCI-scheduled dynamic transmissions on sidelink channels with data alone may also reduce a processing overhead. However, unused SCI resources related to data-only transmissions may be wasted. In some cases, multiplexing SCI-only grants and data-only traffic may reduce unused resources. However, when SCIs and PSSCH data are decoupled, an accuracy of channel sensing in V2X Mode 2 may decrease since a transmitter UE does not necessarily indicate a resource reservation associated with a current slot.

In various aspects of techniques and apparatuses described herein, a first UE and a second UE may be associated with a V2X Mode 2 in which a scheduling of sidelink transmissions resources within sidelink resources may be performed by the first UE and not by a base station. The first UE may transmit, to the second UE, a grant-only indicator to indicate that an SCI-2 is decoupled from PSSCH data in a slot, and that the SCI-2 indicates an SCI-2-only grant. The grant-only indicator may be indicated in an SCI-1 or in the SCI-2 to decouple the SCI-2 and the PSSCH data in the slot. The SCI-1 may be coupled with the PSSCH data in the slot to maintain a channel sensing accuracy level. The first UE may transmit, to the second UE in the slot, the SCI-2-only grant multiplexed with data-only traffic in a first PSSCH transmission based at least in part on the grant-only indicator, where the SCI-2-only grant may indicate a resource allocation for a subsequent slot. The SCI-2-only grant may indicate that the first UE is a transmitter or a receiver on an upcoming resource associated with the resource allocation indicated by the SCI-2-only grant. The first UE may receive, from the second UE in the subsequent slot, a second PSSCH transmission based at least in part on the resource allocation indicated by the SCI-2-only grant. As a result, the first UE may use an SCI-2 to schedule an upcoming sidelink transmission while transmitting data-only traffic to the second UE. An SCI-only grant may be indicated in the SCI-2 and not the SCI-1. In other words, only the SCI-2 may be used for SCI-only grants, which may indicate upcoming sidelink resources to enable the upcoming sidelink transmissions.

Figure 10:
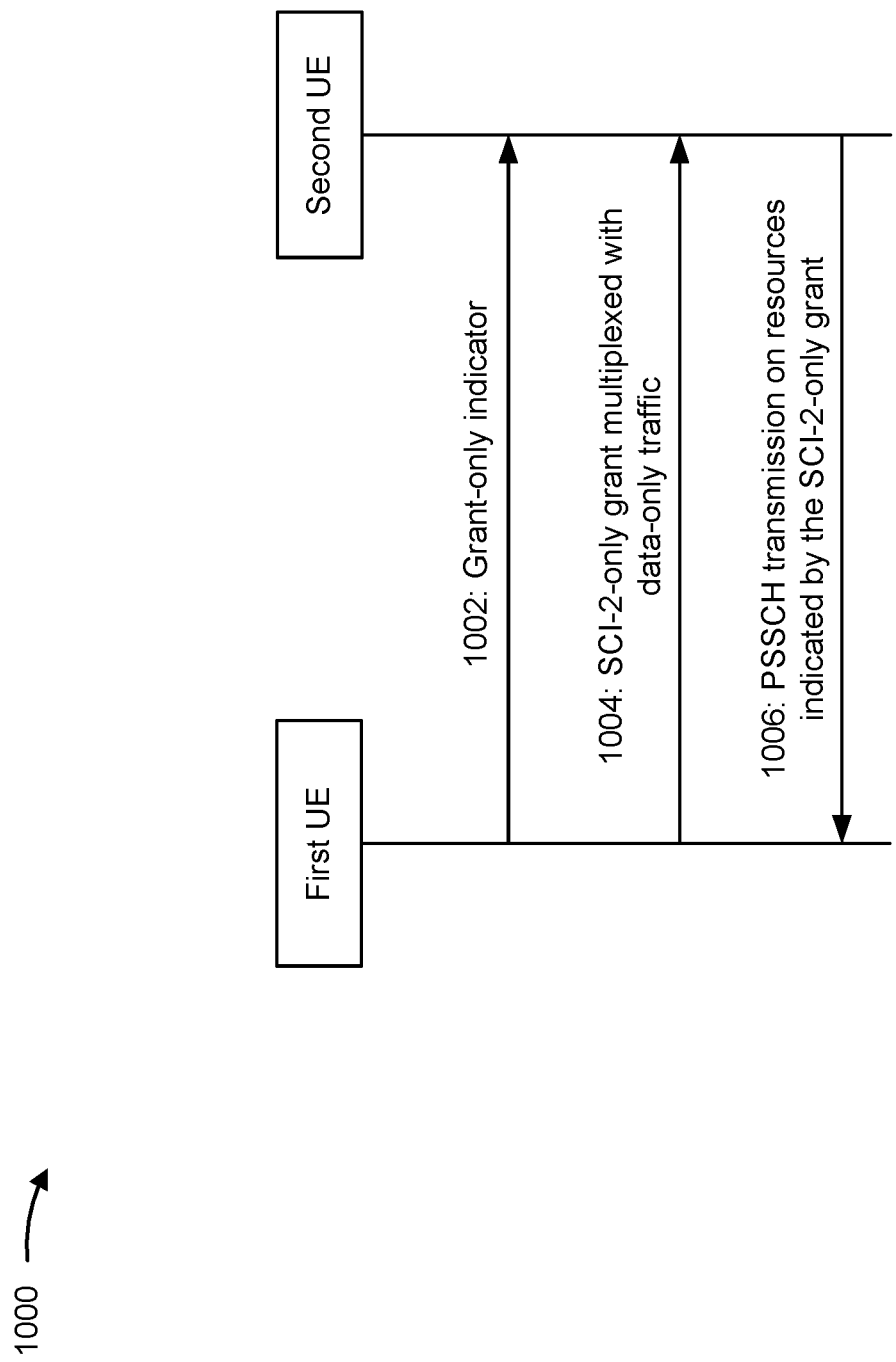
FIG. 10 is a diagram illustrating an example associated with multiplexing sidelink control information (SCI)-only grants and data-only traffic, in accordance with the present disclosure.

FIG. 10 is a diagram illustrating an example 1000 of multiplexing SCI-only grants and data-only traffic, in accordance with the present disclosure. As shown in FIG. 10, example 1000 includes communication between a first UE (e.g., UE 120a) and a second UE (e.g., UE 120e). In some aspects, the first UE and the second UE may be included in a wireless network, such as wireless network 100.

In some aspects, the first UE may be a PLC, and the second UE may be a sensor/actuator.

As shown by reference number 1002, the first UE may transmit, to the second UE, a grant-only indicator to indicate that an SCI-2 is decoupled from PSSCH data in a slot, and that the SCI-2 indicates an SCI-2-only grant. The grant-only indicator may be indicated in an SCI-1 or in the SCI-2 to decouple the SCI-2 and the PSSCH data in the slot. The grant-only indicator may be an explicit indication based at least in part on a cyclic redundancy check (CRC) scrambling of the SCI-2. The grant-only indicator may be an implicit indication based at least in part on a grant-only SCI-2 format. The grant-only indicator may be one or more explicit bits in the SCI-2. The grant-only indicator may be one or more explicit bits in an SCI-1. Further, the first UE may transmit the SCI-1 that indicates a resource allocation for the slot (e.g., a current slot and not a subsequent slot).

In some aspects, the first UE (e.g., a PLC) may use an SCI-2 to transmit an SCI-only grant on the slot that contains data-only traffic transmitted by the first UE. The SCI-only grant may indicate an upcoming sidelink reservation. In some aspects, the grant-only indicator transmitted in the SCI-1 or the SCI-2 may indicate that the SCI-2 and the PSSCH data are decoupled, and/or that the SCI-2 contains a sidelink grant. In some aspects, the grant-only indicator may be an explicit indication based on at least in part on CRC scrambling of the SCI-2 (e.g., a grant-only radio network temporary identifier (RNTI)). In some aspects, the grant-only indicator may be an implicit indication based at least in part on a grant-only SCI-2 format. In some aspects, the grant-only indicator may be one or more explicit bits in the SCI-2 (e.g., a grant-only flag in the SCI-2). In some aspects, the grant-only indicator may be one or more explicit bits in the SCI-1 (e.g., an SCI-2 format field in the SCI-1).

As shown by reference number 1004, the first UE may transmit, to the second UE in the slot, the SCI-2-only grant multiplexed with data-only traffic in a first PSSCH transmission based at least in part on the grant-only indicator. The SCI-2-only grant may indicate a resource allocation for the subsequent slot. The SCI-2-only grant may indicate that the first UE is a transmitter or a receiver on an upcoming resource associated with the resource allocation indicated by the SCI-2-only grant, where the resource allocation may be in the subsequent slot.

In some aspects, the SCI-2-only grant may indicate time and frequency resource assignments for the second UE to detect the resource allocation indicated by the SCI-2-only grant. The SCI-2-only grant may indicate a source identifier and a destination identifier to enable the second UE to determine that the SCI-2-only grant is associated with the second UE. The SCI-2-only grant may indicate a HARQ process identifier or a new data indicator to enable the first UE to request a data transmission or a data retransmission. The SCI-2-only grant may indicate an MCS indicator to enable the first UE to indicate a suggested MCS for a requested data transmission or a requested data retransmission. The SCI-2-only grant may indicate priority information, a DMRS, and/or an SCI-2 format and a corresponding beta offset.

In some aspects, the first UE may transmit the SCI-2-only grant in the slot to indicate that the first UE is either a transmitter or a receiver on upcoming resources indicated in the SCI-2-only grant. In some aspects, the SCI-2-only grant may indicate time and frequency resource assignments, which may be used by other UEs (including the second UE) to detect upcoming reservations indicated by the SCI-2-only grant. In some aspects, the SCI-2-only grant may indicate source and destination identifiers, which may be used by other UEs to detect whether the SCI-2-only grant is associated with one or more of the other UEs. For example, the first UE may grant another UE to transmit/retransmit data to the first UE via a sidelink interface. In some aspects, the SCI-2-only grant may indicate a HARQ process identifier, which may be used by the first UE to request a transmission/retransmission from another UE to the transmitting UE. In some aspects, the SCI-2-only grant may indicate a new data indicator, which may be used by the first UE to request a transmission/retransmission from another UE to the first UE. In some aspects, the SCI-2-only grant may indicate an MCS indicator, which may be used by the first UE to suggest a recommended MCS for a requested transmission/retransmission from another UE to the first UE. In some aspects, the SCI-2-only grant may indicate any remaining fields in an SCI-1 and/or an SCI-2, including priority information, a DMRS pattern, and/or an SCI-2 format and a corresponding beta offset. In some aspects, field values in subsequent SCIs associated with the SCI-2-only grant may overlap with field values in the SCI-2-only grant.

In some aspects, the first UE may not be a transmitter or a receiver on indicated upcoming resources. For example, the first UE may act as a base station that controls a cell having a plurality of UEs.

In some aspects, in a V2X Mode 2, the grant-only indicator may be transmitted in the SCI-1 or the SCI-2 to decouple the SCI-2 and PSSCH data in a same slot. As a result, SCI-2 only traffic may be multiplexed with data-only sidelink traffic. The SCI-1 and the PSSCH data in the same slot may remain coupled, such that an accuracy of channel sensing in the V2X Mode 2 is not negatively affected. The SCI-2, and not the SCI-1, may be used for SCI-only grants. In other words, information associated with the SCI-only grant may be indicated in the SCI-2.

As shown by reference number 1006, the second UE may transmit, to the first UE in the subsequent slot, a second PSSCH transmission based at least in part on the resource allocation indicated by the SCI-2-only grant. An SCI-1 and an SCI-2 associated with the subsequent slot may be based at least in part on the SCI-2-only grant transmitted in the slot. The second UE may monitor the SCI-1 indicated in the slot and an SCI-1 indicated in the subsequent slot for channel estimation. The SCI-2-only grant indicated in the slot may include a subset of fields in SCIs indicated in the subsequent slot.

In some aspects, the SCI-1 may be coupled with the PSSCH data in the slot to maintain a channel sensing accuracy level. In some aspects, the first UE and the second UE may be associated with the V2X Mode 2, in which a scheduling of sidelink transmissions resources within sidelink resources may be performed by the first UE and not a base station.

In some aspects, the first UE may use the SCI-2 to schedule an upcoming sidelink transmission while transmitting data-only traffic to the second UE. The SCI-1 and the PSSCH data in the same slot may remain coupled so that an accuracy of channel sensing in the V2X Mode 2 is not negatively affected. A high-priority sidelink resource reservation via a pair of same-slot SCIs may be preceded by an additional SCI-2-only grant. When a plurality of UEs in the V2X Mode 2 decode SCI-2-only grants in addition to SCI-1s, channel estimation may be improved and resource collisions may be reduced.

In some aspects, the SCI-2-only grant may be associated with a timeline. In slot n, the first UE may multiplex the SCI-2-only grant and data-only traffic in a single PSSCH transmission to the second UE. The first UE may multiplex the SCI-2-only grant and the data-only traffic based at least in part on the grant-only indicator and various fields in the SCI-2-only grant (e.g., time and frequency resource assignments, source and destination identifiers, HARQ process identifier, new data indicator, MCS indicator, and/or remaining fields in the SCI-1 and/or the SCI-2). An SCI-1 transmitted by the first UE may indicate a resource allocation for slot n, and the SCI-2-only grant may indicate a resource allocation for an upcoming slot n+k. Slot n may be a slot and slot n+k may be a subsequent slot. The SCI-2-only grant may indicate the second UE as a transmitter for the upcoming slot n+k. In the slot n+k, the second UE may transmit a single PSSCH transmission on resources indicated in the SCI-2-only grant. An SCI-1 and an SCI-2 in slot n+k may be prepared in accordance with the SCI-2-only grant in slot n.

In some aspects, when a plurality of fields (e.g., all fields) in an SCI-2 to be transmitted in slot n+k may be readily derived from the SCI-2-only grant, the SCI-2 may be omitted or may be replaced by another SCI-2-only grant.

In some aspects, in the V2X Mode 2, during a UE monitoring procedure, a plurality of UEs may each monitor a plurality of SCI-1s, including the SCI-1 in slot n and the SCI-1 in slot n+k for channel estimation. The plurality of UEs may each expect that the SCI-2-only grant in slot n contains a subset of fields in SCIs in slot n+k.

As indicated above, FIG. 10 is provided as an example. Other examples may differ from what is described with respect to FIG. 10.

Figure 11:
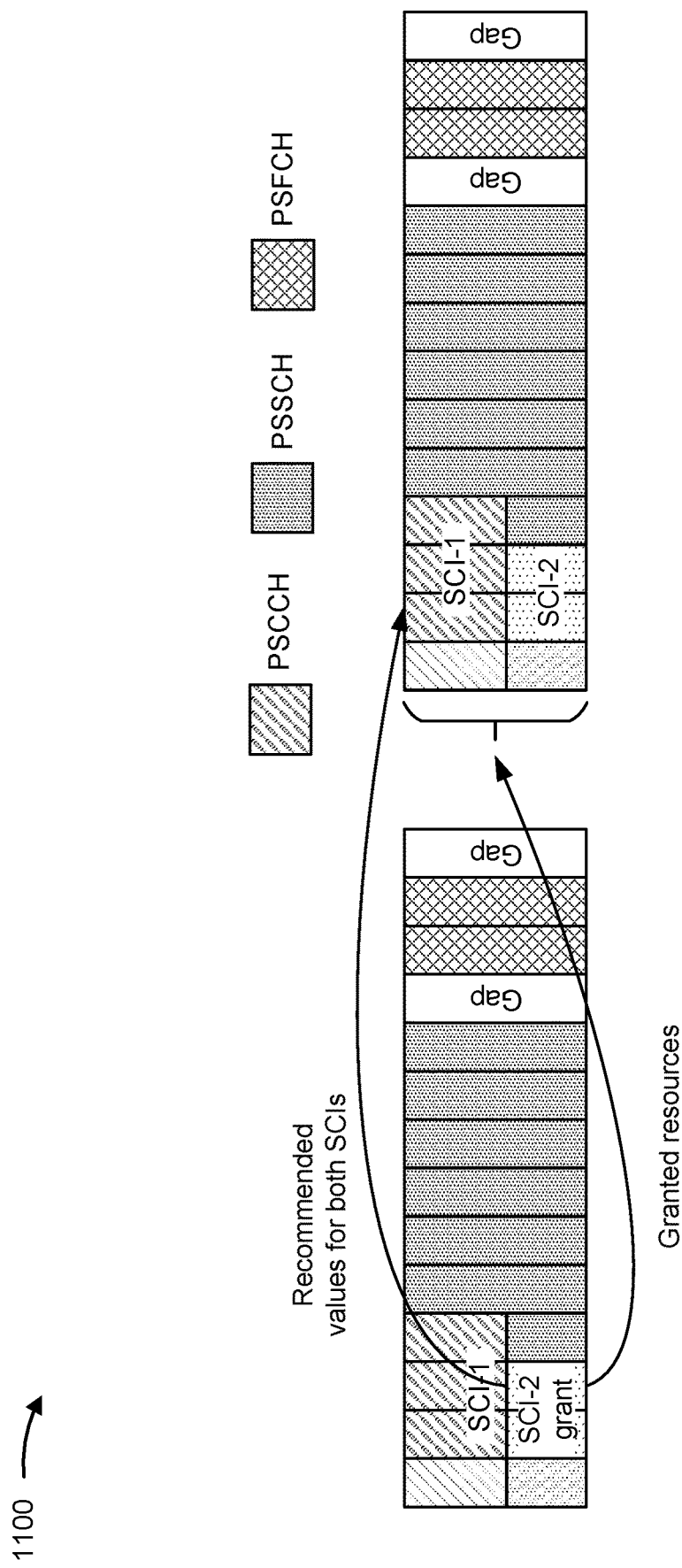
FIG. 11 is a diagram illustrating an example associated with a timeline of an SCI-only grant, in accordance with the present disclosure.

FIG. 11 is a diagram illustrating an example 1100 of a timeline of an SCI-only grant, in accordance with the present disclosure.

As shown in FIG. 11, in a slot n, a first UE may transmit an SCI-1 and an SCI-2-only grant. The SCI-1 may indicate a resource allocation for the slot n. The first UE may multiplex the SCI-2-only grant and data-only traffic in a single PSSCH transmission via a grant-only indicator and one or more fields of the SCI-2-only grant. The SCI-2-only grant may indicate recommended values for both an SCI-1 and an SCI-2 in a slot n+k. The SCI-2-only grant may indicate granted resources in the slot n+k. In other words, the SCI-2-only grant may indicate a resource allocation for an upcoming slot n+k. In slot n+k, the second UE indicated in the SCI-2-only grant may transmit a single PSSCH transmission using resources indicated by the SCI-2-only grant.

As indicated above, FIG. 11 is provided as an example. Other examples may differ from what is described with respect to FIG. 11.

Figure 12:
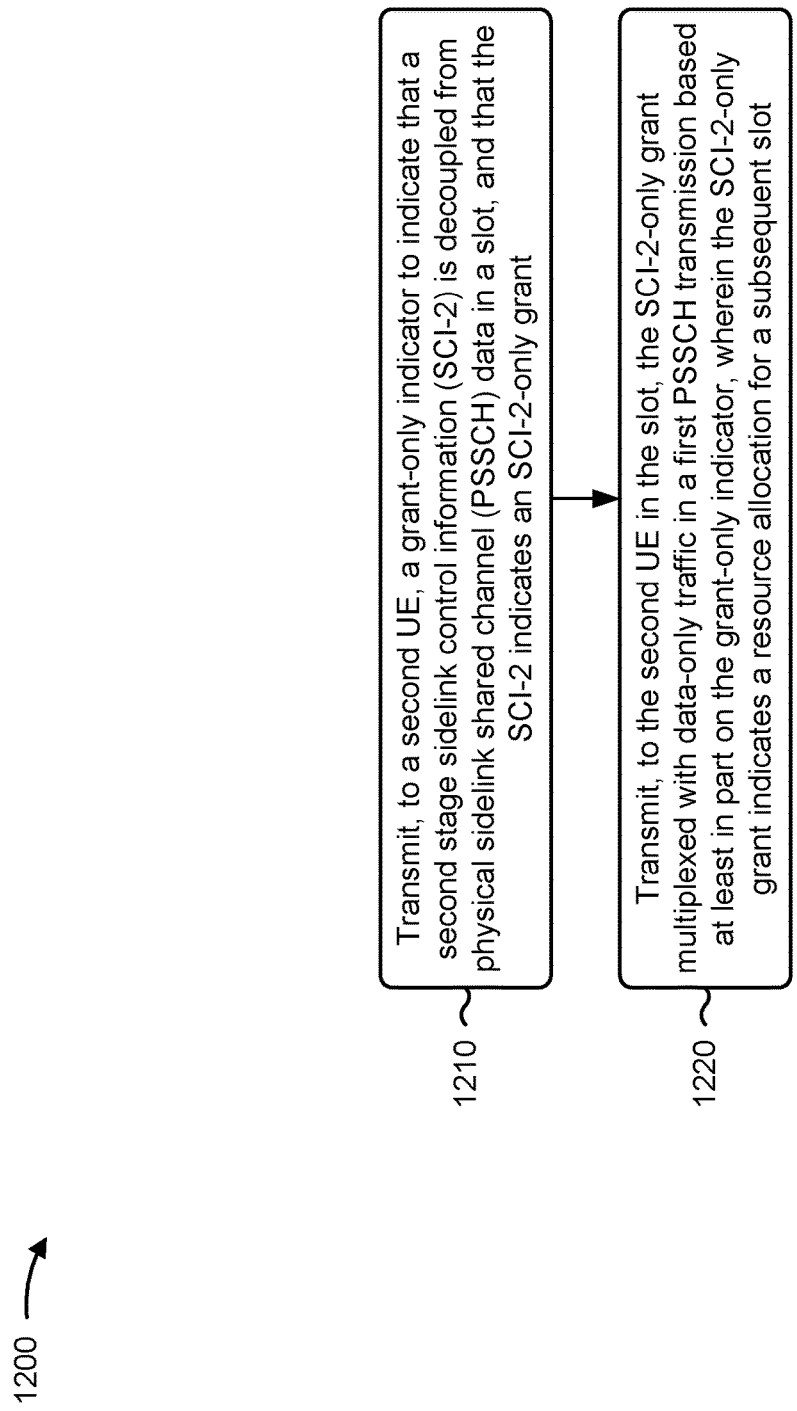
FIGS. 12-13 are diagrams illustrating example processes associated with multiplexing SCI-only grants and data-only traffic, in accordance with the present disclosure.

FIG. 12 is a diagram illustrating an example process 1200 performed, for example, by a first UE, in accordance with the present disclosure. Example process 1200 is an example where the first UE (e.g., UE 120*a*) performs operations associated with multiplexing SCI-only grants and data-only traffic.

As shown in FIG. 12, in some aspects, process 1200 may include transmitting, to a second UE, a grant-only indicator to indicate that an SCI-2 is decoupled from PSSCH data in a slot, and that the SCI-2 indicates an SCI-2-only grant (block 1210). For example, the first UE (e.g., using communication manager 140 and/or transmission component 1404, depicted in FIG. 14) may transmit, to a second UE, a grant-only indicator to indicate that an SCI-2 is decoupled from PSSCH data in a slot, and that the SCI-2 indicates an SCI-2-only grant, as described above.

As further shown in FIG. 12, in some aspects, process 1200 may include transmitting, to the second UE in the slot, the SCI-2-only grant multiplexed with data-only traffic in a first PSSCH transmission based at least in part on the grant-only indicator, wherein the SCI-2-only grant indicates a resource allocation for a subsequent slot (block 1220). For example, the first UE (e.g., using communication manager 140 and/or transmission component 1404, depicted in FIG. 14) may transmit, to the second UE in the slot, the SCI-2-only grant multiplexed with data-only traffic in a first PSSCH transmission based at least in part on the grant-only indicator, wherein the SCI-2-only grant indicates a resource allocation for a subsequent slot, as described above.

Process 1200 may include additional aspects, such as any single aspect or any combination of aspects described below and/or in connection with one or more other processes described elsewhere herein.

In a first aspect, the grant-only indicator is indicated in an SCI-1 or in the SCI-2 to decouple the SCI-2 and the PSSCH data in the slot.

In a second aspect, alone or in combination with the first aspect, the grant-only indicator is one of an explicit indication based at least in part on a CRC scrambling of the SCI-2, an implicit indication based at least in part on a grant-only SCI-2 format, one or more explicit bits in the SCI-2, or one or more explicit bits in an SCI-1.

In a third aspect, alone or in combination with one or more of the first and second aspects, process 1200 includes transmitting an SCI-1 that indicates a resource allocation for the slot.

In a fourth aspect, alone or in combination with one or more of the first through third aspects, process 1200 includes receiving, from the second UE in the subsequent slot, a second PSSCH transmission based at least in part on the resource allocation indicated by the SCI-2-only grant, wherein an SCI-1 and an SCI-2 associated with the subsequent slot are based at least in part on the SCI-2-only grant transmitted in the slot.

In a fifth aspect, alone or in combination with one or more of the first through fourth aspects, the SCI-2-only grant indicates that the first UE is a transmitter or a receiver on an upcoming resource associated with the resource allocation indicated by the SCI-2-only grant.

In a sixth aspect, alone or in combination with one or more of the first through fifth aspects, the SCI-2-only grant indicates one or more of time and frequency resource assignments for the second UE to detect the resource allocation indicated by the SCI-2-only grant, a source identifier and a destination identifier to enable the second UE to determine that the SCI-2-only grant is associated with the second UE, a HARQ process identifier or a new data indicator to enable the first UE to request a data transmission or a data retransmission, an MCS indicator to enable the first UE to indicate a suggested MCS for a requested data transmission or a requested data retransmission, or one or more of priority information, a DMRS, or an SCI-2 format and a corresponding beta offset.

In a seventh aspect, alone or in combination with one or more of the first through sixth aspects, an SCI-1 is coupled with the PSSCH data in the slot to maintain a channel sensing accuracy level, and the first UE and the second UE are associated with a Mode 2 in which a scheduling of sidelink transmissions resources within sidelink resources is performed by the first UE and not a base station.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
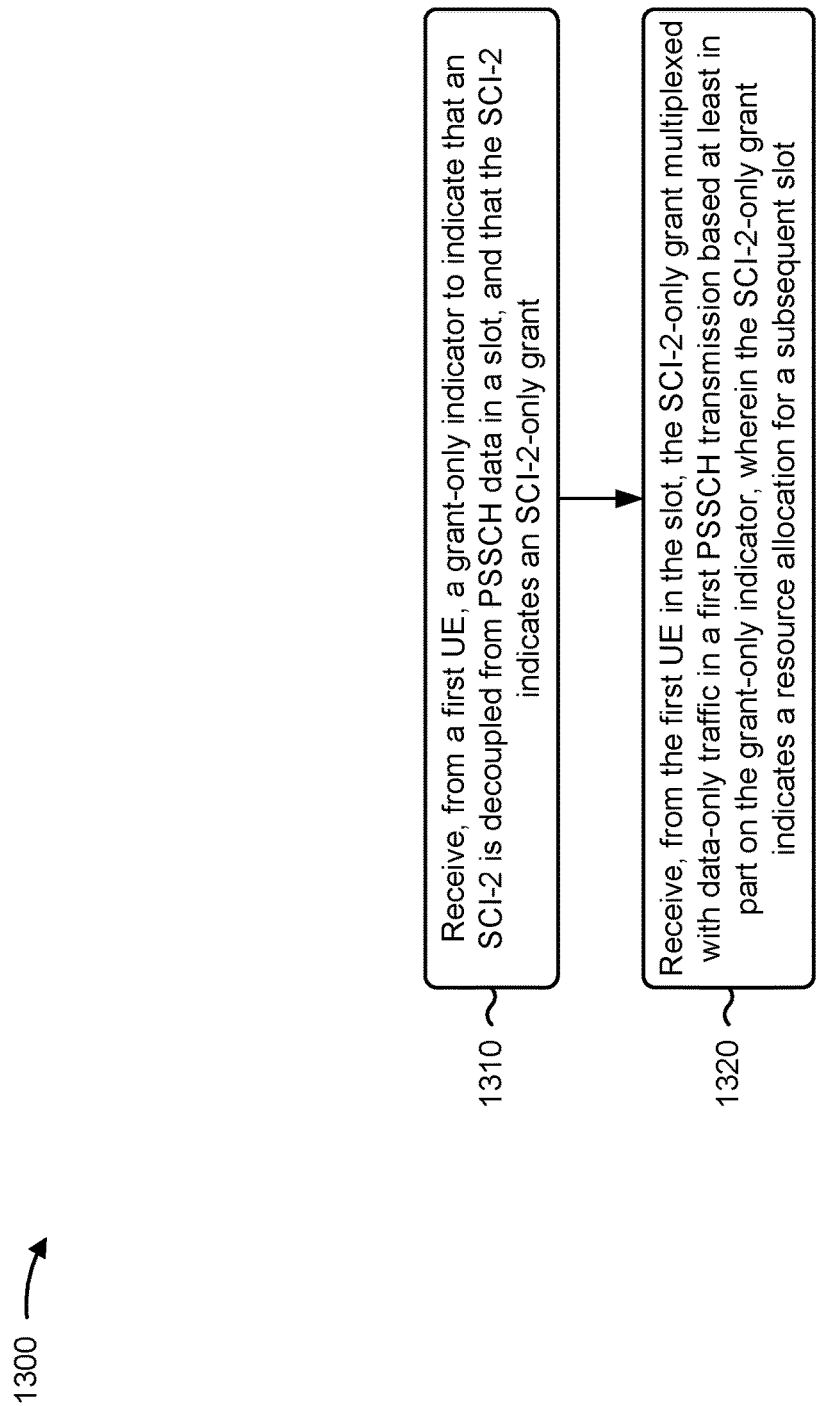

FIG. 13 is a diagram illustrating an example process 1300 performed, for example, by a second UE, in accordance with the present disclosure. Example process 1300 is an example where the second UE (e.g., UE 120*e*) performs operations associated with multiplexing SCI-only grants and data-only traffic.

As shown in FIG. 13, in some aspects, process 1300 may include receiving, from a first UE, a grant-only indicator to indicate that an SCI-2 is decoupled from PSSCH data in a slot, and that the SCI-2 indicates an SCI-2-only grant (block 1310). For example, the second UE (e.g., using communication manager 140 and/or reception component 1502, depicted in FIG. 15) may receive, from a first UE, a grant-only indicator to indicate that an SCI-2 is decoupled from PSSCH data in a slot, and that the SCI-2 indicates an SCI-2-only grant, as described above.

As further shown in FIG. 13, in some aspects, process 1300 may include receiving, from the first UE in the slot, the SCI-2-only grant multiplexed with data-only traffic in a first PSSCH transmission based at least in part on the grant-only indicator, wherein the SCI-2-only grant indicates a resource allocation for a subsequent slot (block 1320). For example, the second UE (e.g., using communication manager 140 and/or reception component 1502, depicted in FIG. 15) may receive, from the first UE in the slot, the SCI-2-only grant multiplexed with data-only traffic in a first PSSCH transmission based at least in part on the grant-only indicator, wherein the SCI-2-only grant indicates a resource allocation for a subsequent slot, as described above.

Process 1300 may include additional aspects, such as any single aspect or any combination of aspects described below and/or in connection with one or more other processes described elsewhere herein.

In a first aspect, the grant-only indicator is indicated in an SCI-1 or in the SCI-2 to decouple the SCI-2 and the PSSCH data in the slot.

In a second aspect, alone or in combination with the first aspect, the grant-only indicator is one of an explicit indication based at least in part on a CRC scrambling of the SCI-2, an implicit indication based at least in part on a grant-only SCI-2 format, one or more explicit bits in the SCI-2, or one or more explicit bits in an SCI-1.

In a third aspect, alone or in combination with one or more of the first and second aspects, process 1300 includes receiving, from the first UE, an SCI-1 that indicates a resource allocation for the slot.

In a fourth aspect, alone or in combination with one or more of the first through third aspects, process 1300 includes transmitting, to the first UE in the subsequent slot, a second PSSCH transmission based at least in part on the resource allocation indicated by the SCI-2-only grant, wherein an SCI-1 and an SCI-2 associated with the subsequent slot are based at least in part on the SCI-2-only grant transmitted in the slot.

In a fifth aspect, alone or in combination with one or more of the first through fourth aspects, the SCI-2-only grant indicates one or more of time and frequency resource assignments for the second UE to detect the resource allocation indicated by the SCI-2-only grant, a source identifier and a destination identifier to enable the second UE to determine that the SCI-2-only grant is associated with the second UE, a HARQ process identifier or a new data indicator to enable the first UE to request a data transmission or a data retransmission, an MCS indicator to enable the first UE to indicate a suggested MCS for a requested data transmission or a requested data retransmission, or one or more of priority information, a DMRS, or an SCI-2 format and a corresponding beta offset.

In a sixth aspect, alone or in combination with one or more of the first through fifth aspects, process 1300 includes monitoring an SCI-1 indicated in the slot and an SCI-1 indicated in the subsequent slot for channel estimation, wherein the SCI-2-only grant indicated in the slot includes a subset of fields in SCIs indicated in the subsequent slot.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
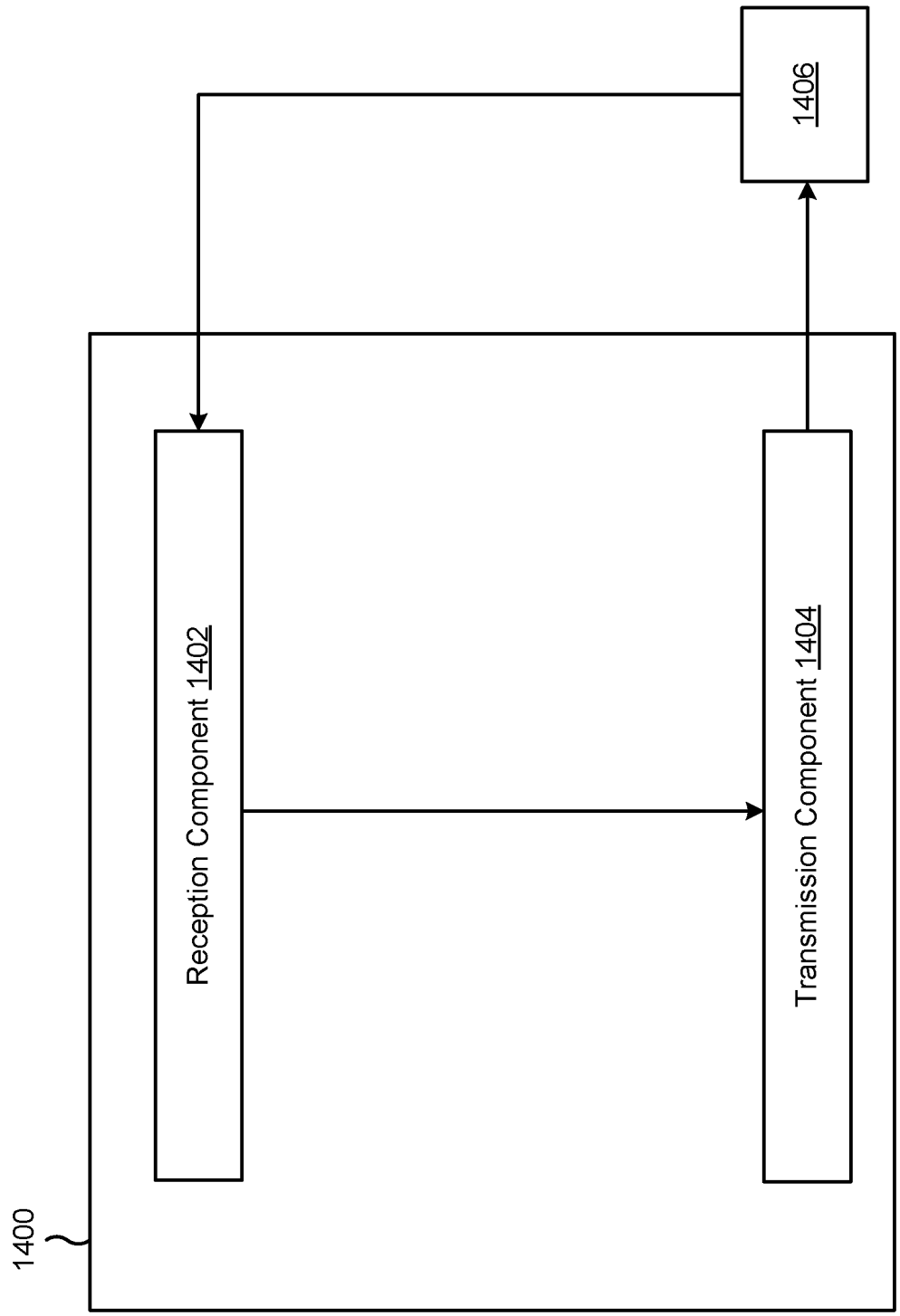
FIGS. 14-15 are diagrams of example apparatuses for wireless communication, in accordance with the present disclosure.

FIG. 14 is a diagram of an example apparatus 1400 for wireless communication. The apparatus 1400 may be a first UE, or a first UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404.

In some aspects, the apparatus 1400 may be configured to perform one or more operations described herein in connection with FIGS. 10-11. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the first UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a modem, a demodulator, a MIMO detector, a receive processor, a controller/processor, a memory, or a combination thereof, of the first UE described in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the first UE described in connection with FIG. 2. In some aspects, the transmission component 1404 may be co-located with the reception component 1402 in a transceiver.

The transmission component 1404 may transmit, to a second UE, a grant-only indicator to indicate that an SCI-2 is decoupled from PSSCH data in a slot, and that the SCI-2 indicates an SCI-2-only grant. The transmission component 1404 may transmit, to the second UE in the slot, the SCI-2-only grant multiplexed with data-only traffic in a first PSSCH transmission based at least in part on the grant-only indicator, wherein the SCI-2-only grant indicates a resource allocation for a subsequent slot.

The transmission component 1404 may transmit an SCI-1 that indicates a resource allocation for the slot. The reception component 1402 may receive, from the second UE in the subsequent slot, a second PSSCH transmission based at least in part on the resource allocation indicated by the SCI-2-only grant, wherein an SCI-1 and an SCI-2 associated with the subsequent slot are based at least in part on the SCI-2-only grant transmitted in the slot.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
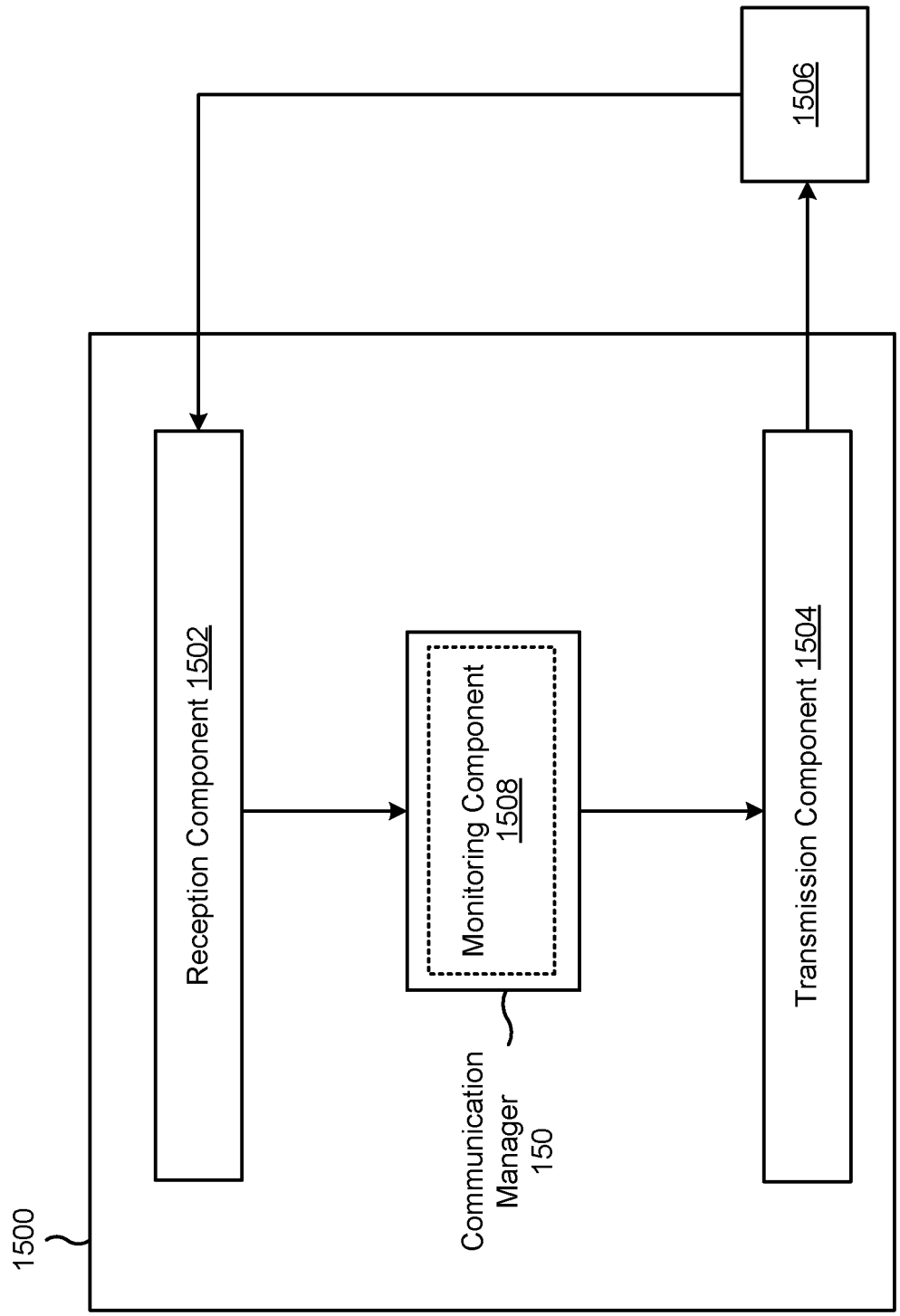

FIG. 15 is a diagram of an example apparatus 1500 for wireless communication. The apparatus 1500 may be a second UE, or a second UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include a monitoring component 1508, among other examples.

In some aspects, the apparatus 1500 may be configured to perform one or more operations described herein in connection with FIGS. 10-11. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the second UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a modem, a demodulator, a MIMO detector, a receive processor, a controller/processor, a memory, or a combination thereof, of the second UE described in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the second UE described in connection with FIG. 2. In some aspects, the transmission component 1504 may be co-located with the reception component 1502 in a transceiver.

The reception component 1502 may receive, from a first UE, a grant-only indicator to indicate that an SCI-2 is decoupled from PSSCH data in a slot, and that the SCI-2 indicates an SCI-2-only grant. The reception component 1502 may receive, from the first UE in the slot, the SCI-2-only grant multiplexed with data-only traffic in a first PSSCH transmission based at least in part on the grant-only indicator, wherein the SCI-2-only grant indicates a resource allocation for a subsequent slot.

The reception component 1502 may receive, from the first UE, an SCI-1 that indicates a resource allocation for the slot. The transmission component 1504 may transmit, to the first UE in the subsequent slot, a second PSSCH transmission based at least in part on the resource allocation indicated by the SCI-2-only grant, wherein an SCI-1 and an SCI-2 associated with the subsequent slot are based at least in part on the SCI-2-only grant transmitted in the slot. The monitoring component 1508 may monitor an SCI-1 indicated in the slot and the SCI-1 indicated in the subsequent slot for channel estimation, wherein the SCI-2-only grant indicated in the slot includes a subset of fields in SCIs indicated in the subsequent slot.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a first UE, comprising: transmitting, to a second UE, a grant-only indicator to indicate that a second stage sidelink control information (SCI-2) is decoupled from physical sidelink shared channel (PSSCH) data in a slot, and that the SCI-2 indicates an SCI-2-only grant; and transmitting, to the second UE in the slot, the SCI-2-only grant multiplexed with data-only traffic in a first PSSCH transmission based at least in part on the grant-only indicator, wherein the SCI-2-only grant indicates a resource allocation for a subsequent slot.

Aspect 2: The method of Aspect 1, wherein the grant-only indicator is indicated in a first stage sidelink control information (SCI-1) or in the SCI-2 to decouple the SCI-2 and the PSSCH data in the slot.

Aspect 3: The method of any of Aspects 1 through 2, wherein the grant-only indicator is one of: an explicit indication based at least in part on a cyclic redundancy check scrambling of the SCI-2; an implicit indication based at least in part on a grant-only SCI-2 format; one or more explicit bits in the SCI-2; or one or more explicit bits in a first stage sidelink control information (SCI-1).

Aspect 4: The method of any of Aspects 1 through 3, further comprising: transmitting a first stage sidelink control information (SCI-1) that indicates a resource allocation for the slot.

Aspect 5: The method of any of Aspects 1 through 4, further comprising: receiving, from the second UE in the subsequent slot, a second PSSCH transmission based at least in part on the resource allocation indicated by the SCI-2-only grant, wherein a first stage sidelink control information (SCI-1) and an SCI-2 associated with the subsequent slot is based at least in part on the SCI-2-only grant transmitted in the slot.

Aspect 6: The method of any of Aspects 1 through 5, wherein the SCI-2-only grant indicates that the first UE is a transmitter or a receiver on an upcoming resource associated with the resource allocation indicated by the SCI-2-only grant.

Aspect 7: The method of any of Aspects 1 through 6, wherein the SCI-2-only grant indicates one or more of: time and frequency resource assignments for the second UE to detect the resource allocation indicated by the SCI-2-only grant; a source identifier and a destination identifier to enable the second UE to determine that the SCI-2-only grant is associated with the second UE; a hybrid automatic repeat request process identifier or a new data indicator to enable the first UE to request a data transmission or a data retransmission; a modulation and coding scheme indicator to enable the first UE to indicate a suggested MCS for a requested data transmission or a requested data retransmission; or one or more of priority information, a demodulation reference signal, or an SCI-2 format and a corresponding beta offset.

Aspect 8: The method of any of Aspects 1 through 7, wherein a first stage sidelink control information (SCI-1) is coupled with the PSSCH data in the slot to maintain a channel sensing accuracy level, and wherein the first UE and the second UE are associated with a Mode 2 in which a scheduling of sidelink transmissions resources within sidelink resources is performed by the first UE and not a base station.

Aspect 9: A method of wireless communication performed by a second UE, comprising, comprising: receiving, from a first UE, a grant-only indicator to indicate that a second stage sidelink control information (SCI-2) is decoupled from physical sidelink shared channel (PSSCH) data in a slot, and that the SCI-2 indicates an SCI-2-only grant; and receiving, from the first UE in the slot, the SCI-2-only grant multiplexed with data-only traffic in a first PSSCH transmission based at least in part on the grant-only indicator, wherein the SCI-2-only grant indicates a resource allocation for a subsequent slot.

Aspect 10: The method of Aspect 9, wherein the grant-only indicator is indicated in a first stage sidelink control information (SCI-1) or in the SCI-2 to decouple the SCI-2 and the PSSCH data in the slot.

Aspect 11: The method of any of Aspects 9 through 10, wherein the grant-only indicator is one of: an explicit indication based at least in part on a cyclic redundancy check scrambling of the SCI-2; an implicit indication based at least in part on a grant-only SCI-2 format; one or more explicit bits in the SCI-2; or one or more explicit bits in a first stage sidelink control information (SCI-1).

Aspect 12: The method of any of Aspects 9 through 11, further comprising: receiving, from the first UE, a first stage sidelink control information (SCI-1) that indicates a resource allocation for the slot.

Aspect 13: The method of any of Aspects 9 through 12, further comprising: transmitting, to the first UE in the subsequent slot, a second PSSCH transmission based at least in part on the resource allocation indicated by the SCI-2-only grant, wherein a first stage sidelink control information (SCI-1) and an SCI-2 associated with the subsequent slot is based at least in part on the SCI-2-only grant transmitted in the slot.

Aspect 14: The method of any of Aspects 9 through 13, wherein the SCI-2-only grant indicates one or more of: time and frequency resource assignments for the second UE to detect the resource allocation indicated by the SCI-2-only grant; a source identifier and a destination identifier to enable the second UE to determine that the SCI-2-only grant is associated with the second UE; a hybrid automatic repeat request process identifier or a new data indicator to enable the first UE to request a data transmission or a data retransmission; a modulation and coding scheme indicator to enable the first UE to indicate a suggested MCS for a requested data transmission or a requested data retransmission; or one or more of priority information, a demodulation reference signal, or an SCI-2 format and a corresponding beta offset.

Aspect 15: The method of any of Aspects 9 through 14, further comprising: monitoring a first stage sidelink control information (SCI-1) indicated in the slot and an SCI-1 indicated in the subsequent slot for channel estimation, wherein the SCI-2-only grant indicated in the slot includes a subset of fields in SCIs indicated in the subsequent slot.

Aspect 16: An apparatus for wireless communication at a device, comprising a processor; memory coupled with the processor; and instructions stored in the memory and executable by the processor to cause the apparatus to perform the method of one or more of Aspects 1-8.

Aspect 17: A device for wireless communication, comprising a memory and one or more processors coupled to the memory, the one or more processors configured to perform the method of one or more of Aspects 1-8.

Aspect 18: An apparatus for wireless communication, comprising at least one means for performing the method of one or more of Aspects 1-8.

Aspect 19: A non-transitory computer-readable medium storing code for wireless communication, the code comprising instructions executable by a processor to perform the method of one or more of Aspects 1-8.

Aspect 20: A non-transitory computer-readable medium storing a set of instructions for wireless communication, the set of instructions comprising one or more instructions that, when executed by one or more processors of a device, cause the device to perform the method of one or more of Aspects 9-15.

Aspect 21: An apparatus for wireless communication at a device, comprising a processor; memory coupled with the processor; and instructions stored in the memory and executable by the processor to cause the apparatus to perform the method of one or more of Aspects 9-15.

Aspect 22: A device for wireless communication, comprising a memory and one or more processors coupled to the memory, the one or more processors configured to perform the method of one or more of Aspects 9-15.

Aspect 23: An apparatus for wireless communication, comprising at least one means for performing the method of one or more of Aspects 1-8.

Aspect 24: A non-transitory computer-readable medium storing code for wireless communication, the code comprising instructions executable by a processor to perform the method of one or more of Aspects 9-15.

Aspect 25: A non-transitory computer-readable medium storing a set of instructions for wireless communication, the set of instructions comprising one or more instructions that, when executed by one or more processors of a device, cause the device to perform the method of one or more of Aspects 9-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
   one or more memories; and
   one or more processors, coupled to the one or more memories, configured to:
      transmit, to a second UE, an indicator indicating that a second stage sidelink control information (SCI-2) indicates an SCI-2 grant and indicating that the SCI-2 is decoupled from physical sidelink shared channel (PSSCH) data in a slot; and
      transmit, to the second UE in the slot, the SCI-2 grant multiplexed with data-only traffic in a first PSSCH transmission based at least in part on the indicator, wherein the SCI-2 grant indicates:
         a resource allocation for a transmission in a subsequent slot, and
         one or more recommended field values for one or more subsequent SCIs in the subsequent slot.

2. The apparatus of claim 1, wherein the indicator is indicated in a first stage sidelink control information (SCI-1) or in the SCI-2 to decouple the SCI-2 and the PSSCH data in the slot.

3. The apparatus of claim 1, wherein the indicator is one of:
   an explicit indication based at least in part on a cyclic redundancy check scrambling of the SCI-2;
   an implicit indication based at least in part on an SCI-2 format;
   one or more explicit bits in the SCI-2; or
   one or more explicit bits in a first stage sidelink control information (SCI-1).

4. The apparatus of claim 1, wherein the one or more processors are further configured to:
   transmit a first stage sidelink control information (SCI-1) that indicates a resource allocation for the slot.

5. The apparatus of claim 1, wherein the one or more processors are further configured to:
   receive, from the second UE in the subsequent slot, the transmission based at least in part on the resource allocation indicated by the SCI-2 grant, wherein the transmission is a second PSSCH transmission.

6. The apparatus of claim 1, wherein the SCI-2 grant indicates that the first UE is a transmitter or a receiver on an upcoming resource associated with the resource allocation indicated by the SCI-2 grant.

7. The apparatus of claim 1, wherein the SCI-2 grant indicates one or more of:
   time and frequency resource assignments for the second UE to detect the resource allocation indicated by the SCI-2 grant;
   a source identifier and a destination identifier to enable the second UE to determine that the SCI-2 grant is associated with the second UE;
   a hybrid automatic repeat request process identifier or a new data indicator to enable the first UE to request a data transmission or a data retransmission; or a modulation and coding scheme indicator to enable the first UE to indicate a suggested MCS for a requested data transmission or a requested data retransmission.

8. The apparatus of claim 1, wherein:
a first stage sidelink control information (SCI-1) is coupled with the PSSCH data in the slot based at least in part on the SCI-1 indicating a resource reservation associated with the slot,
a channel sensing accuracy level in the slot is based at least in part on the SCI-1 being coupled with the PSSCH data in the slot, and
the first UE and the second UE are associated with a Mode 2 in which a scheduling of sidelink transmissions resources within sidelink resources is performed by the first UE and not a base station.

9. The apparatus of claim 1, wherein the one or more recommended field values indicate one or more of priority information, a demodulation reference signal pattern, or an SCI-2 format and a corresponding beta offset.

10. An apparatus for wireless communication at a second UE, comprising:
one or more memories; and
one or more processors, coupled to the one or more memories, configured to:
receive, from a first UE, an indicator indicating that a second stage sidelink control information (SCI-2) indicates an SCI-2 grant and indicating that the SCI-2 is decoupled from physical sidelink shared channel (PSSCH) data in a slot; and
receive, from the first UE in the slot, the SCI-2 grant multiplexed with data-only traffic in a first PSSCH transmission based at least in part on the indicator, wherein the SCI-2 grant indicates:
a resource allocation for a transmission in a subsequent slot, and
one or more recommended field values for one or more subsequent SCIs in the subsequent slot.

11. The apparatus of claim 10, wherein the indicator is indicated in a first stage sidelink control information (SCI-1) or in the SCI-2 to decouple the SCI-2 and the PSSCH data in the slot.

12. The apparatus of claim 10, wherein the indicator is one of:
an explicit indication based at least in part on a cyclic redundancy check scrambling of the SCI-2;
an implicit indication based at least in part on an SCI-2 format;
one or more explicit bits in the SCI-2; or
one or more explicit bits in a first stage sidelink control information (SCI-1).

13. The apparatus of claim 10, wherein the one or more processors are further configured to:
receive, from the first UE, a first stage sidelink control information (SCI-1) that indicates a resource allocation for the slot.

14. The apparatus of claim 10, wherein the one or more processors are further configured to:
transmit, to the first UE in the subsequent slot, the transmission based at least in part on the resource allocation indicated by the SCI-2 grant, wherein the transmission is a second PSSCH transmission.

15. The apparatus of claim 10, wherein the SCI-2 grant indicates one or more of:
time and frequency resource assignments for the second UE to detect the resource allocation indicated by the SCI-2 grant;
a source identifier and a destination identifier to enable the second UE to determine that the SCI-2 grant is associated with the second UE;
a hybrid automatic repeat request process identifier or a new data indicator to enable the first UE to request a data transmission or a data retransmission; or
a modulation and coding scheme indicator to enable the first UE to indicate a suggested MCS for a requested data transmission or a requested data retransmission.

16. The apparatus of claim 10, wherein the one or more processors are further configured to:
monitor a first stage sidelink control information (SCI-1) indicated in the slot and an SCI-1 indicated in the subsequent slot for channel estimation, wherein the SCI-2 grant indicated in the slot includes a subset of fields in SCIs indicated in the subsequent slot.

17. A method of wireless communication performed by a first user equipment (UE), comprising:
transmitting, to a second UE, an indicator indicating that a second stage sidelink control information (SCI-2) indicates an SCI-2 grant and indicating that the SCI-2 is decoupled from physical sidelink shared channel (PSSCH) data in a slot; and
transmitting, to the second UE in the slot, the SCI-2 grant multiplexed with data-only traffic in a first PSSCH transmission based at least in part on the indicator, wherein the SCI-2 grant indicates:
a resource allocation for a transmission in a subsequent slot, and
one or more recommended field values for one or more subsequent SCIs in the subsequent slot.

18. The method of claim 17, wherein the indicator is indicated in a first stage sidelink control information (SCI-1) or in the SCI-2 to decouple the SCI-2 and the PSSCH data in the slot.

19. The method of claim 17, wherein the indicator is one of:
an explicit indication based at least in part on a cyclic redundancy check scrambling of the SCI-2;
an implicit indication based at least in part on an SCI-2 format;
one or more explicit bits in the SCI-2; or
one or more explicit bits in a first stage sidelink control information (SCI-1).

20. The method of claim 17, further comprising:
transmitting a first stage sidelink control information (SCI-1) that indicates a resource allocation for the slot.

21. The method of claim 17, further comprising:
receiving, from the second UE in the subsequent slot, the transmission based at least in part on the resource allocation indicated by the SCI-2 grant, wherein the transmission is a second PSSCH transmission.

22. The method of claim 17, wherein the SCI-2 grant indicates that the first UE is a transmitter or a receiver on an upcoming resource associated with the resource allocation indicated by the SCI-2 grant.

23. The method of claim 17, wherein the SCI-2 grant indicates one or more of:
time and frequency resource assignments for the second UE to detect the resource allocation indicated by the SCI-2 grant;
a source identifier and a destination identifier to enable the second UE to determine that the SCI-2 grant is associated with the second UE;
a hybrid automatic repeat request process identifier or a new data indicator to enable the first UE to request a data transmission or a data retransmission; or a modulation and coding scheme indicator to enable the first UE to indicate a suggested MCS for a requested data transmission or a requested data retransmission.

24. The method of claim 17, wherein:
a first stage sidelink control information (SCI-1) is coupled with the PSSCH data in the slot based at least in part on the SCI-1 indicating a resource reservation associated with the slot,
a channel sensing accuracy level in the slot is based at least in part on the SCI-1 being coupled with the PSSCH data in the slot, and
the first UE and the second UE are associated with a Mode 2 in which a scheduling of sidelink transmissions resources within sidelink resources is performed by the first UE and not a base station.

25. A method of wireless communication performed by a second user equipment (UE), comprising:
receiving, from a first UE, an indicator indicating that a second stage sidelink control information (SCI-2) indicates an SCI-2 grant and indicating that the SCI-2 is decoupled from physical sidelink shared channel (PSSCH) data in a slot; and
receiving, from the first UE in the slot, the SCI-2 grant multiplexed with data-only traffic in a first PSSCH transmission based at least in part on the indicator, wherein the SCI-2 grant indicates:
a resource allocation for a transmission in a subsequent slot, and
one or more recommended field values for one or more subsequent SCIs in the subsequent slot.

26. The method of claim 25, wherein the indicator is indicated in a first stage sidelink control information (SCI-1) or in the SCI-2 to decouple the SCI-2 and the PSSCH data in the slot.

27. The method of claim 25, wherein the indicator is one of:
an explicit indication based at least in part on a cyclic redundancy check scrambling of the SCI-2;
an implicit indication based at least in part on an SCI-2 format;
one or more explicit bits in the SCI-2; or
one or more explicit bits in a first stage sidelink control information (SCI-1).

28. The method of claim 25, further comprising:
receiving, from the first UE, a first stage sidelink control information (SCI-1) that indicates a resource allocation for the slot.

29. The method of claim 25, further comprising:
transmitting, to the first UE in the subsequent slot, the transmission based at least in part on the resource allocation indicated by the SCI-2 grant, wherein the transmission is a second PSSCH transmission.

30. The method of claim 25, wherein the SCI-2 grant indicates one or more of:
time and frequency resource assignments for the second UE to detect the resource allocation indicated by the SCI-2 grant;
a source identifier and a destination identifier to enable the second UE to determine that the SCI-2 grant is associated with the second UE;
a hybrid automatic repeat request process identifier or a new data indicator to enable the first UE to request a data transmission or a data retransmission; or
a modulation and coding scheme indicator to enable the first UE to indicate a suggested MCS for a requested data transmission or a requested data retransmission.

31. The method of claim 25, further comprising:
monitoring a first stage sidelink control information (SCI-1) indicated in the slot and an SCI-1 indicated in the subsequent slot for channel estimation, wherein the SCI-2 grant indicated in the slot includes a subset of fields in SCIs indicated in the subsequent slot.

* * * * *